Dec. 25, 1951     A. T. SCOTT     2,579,619
FLEXIBLE TAIL PIPE FOR JET ENGINES
Filed Dec. 14, 1949     2 SHEETS—SHEET 1
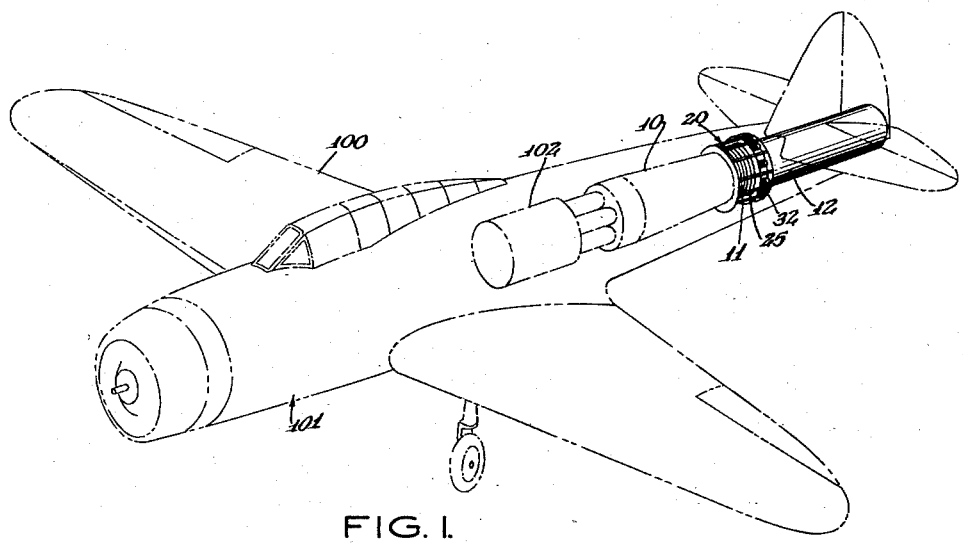
FIG. 1.
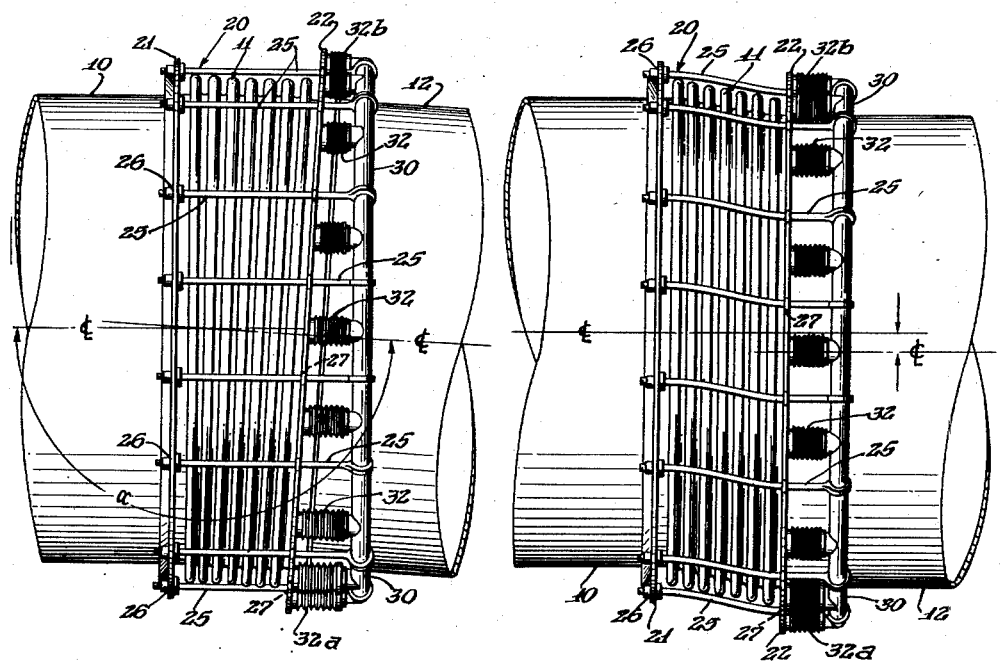
FIG. 3.
DISPLACED POSITION OF
PIPE DUCT AT AN ANGLE
TO ITS ORIGINAL AXIS
FIG. 2.
DISPLACED POSITION OF
PIPE DUCT PARALLEL TO ITS
ORIGINAL AXIS
INVENTOR
ASHTON T. SCOTT
BY
ATTORNEYS Dec. 25, 1951     A. T. SCOTT     2,579,619
FLEXIBLE TAIL PIPE FOR JET ENGINES Filed Dec. 14, 1949     2 SHEETS—SHEET 2

INVENTOR
ASHTON T. SCOTT
BY
ATTORNEYS

Patented Dec. 25, 1951

2,579,619

UNITED STATES PATENT OFFICE 2,579,619

FLEXIBLE TAIL PIPE FOR JET ENGINES

Ashton T. Scott, Bryn Mawr, Pa., assignor to I-T-E Circuit Breaker Company, Philadelphia, Pa., a corporation of Pennsylvania Application December 14, 1949, Serial No. 132,968

5 Claims. (Cl. 285—1)

My present invention relates to a flexible coupling for two members, such as the tail pipe of a jet propelled engine, and more particularly to a bellows type coupling permitting axial displacement of the tail pipe on a line parallel to the original axis as well as displacement of the tail pipe at an angle to the axis.

In pipe systems for the transmission of fluids under pressure, the need is encountered frequently for the introduction of flexible sections or couplings to permit relative motion of the pipe ends without developing substantial reactive stresses in the pipe or transmitting such forces to attached equipment or structures.

This general problem is encountered in the mounting of a jet engine with its associated exhaust duct in the fuselage of an aircraft. In a typical case, the engine is mounted rigidly near the mid-point of the fore-and-aft axis of the fuselage with its jet stream carried aft either through an after-burner section or a tail pipe.

The long overhang of either type of exhaust duct requires that it be supported near its after end by the fuselage. This support must permit free longitudinal motion of the duct to allow for the very large thermal expansion of the duct in operation.

Under certain operating conditions, the tail of the aircraft may be subjected to outside forces which substantially deflect the after end of the fuselage. Any such deflection is transmitted by the aforementioned support of the exhaust duct.

In the absence of a flexible joint in the duct, this deflection must result either in buckling of the duct or transmission by it of a large reactive bending moment to the turbine casing. Various coupling designs have been tried with less than satisfactory results. Under the high temperatures which prevail, joints of the ball and socket type invariably seize and become inoperative. Also they fail to give a positive seal. Joints of the flexible bellows type can readily be designed to withstand the radial pressure forces and also have the requisite flexibility. However, joints so designed cannot withstand the longitudinal forces (as high as 10,000 points in an after-burner installation) which exist in the exhaust duct.

Increasing the thickness of the bellows material to give the bellows sufficient strength in tension is unacceptable since it causes a corresponding increase in bellows stiffness, effectively destroying its usefulness.

Various attempts have been made to secure alternate methods by which the flexibility of the coupling may be preserved while also preserving its strength.

Thus, where a bellows arrangement has previously been used, prior attempts have included a pair of pivoted tie bars arranged to transfer longitudinal forces around the flexible bellows. This has permitted displacement of the tail pipe around an axis through the pivots but prevents any displacement around the axis perpendicular to that through the pivots.

Where the pivot holes in the tie bars are elongated to permit such latter type of displacements, then a very small lateral deflection results in all the longitudinal tension being concentrated on one or the other of the tie bars and therefore on one side of the duct and the turbine casing. Therefore, very large changes in stress may then result from very small pipe motions.

My invention is the improvement of flexible pipe-couplings which consists in transferring the longitudinal tension forces in the pipe around the flexible portion of the coupling and supporting these forces by compression of a multiplicity of intercommunicating liquid filled bellows of substantially smaller diameter than the pipe being coupled and arranged symmetrically around it.

Thus, the primary object of my invention is the provision of a reinforcing stress distributing frame around a flexible connection between two pipes or ducts in such manner that all longitudinal stresses will be supported by the stress distributing frame and will be distributed equally thereover, therefore making it possible to construct the flexible coupling for the greatest possible flexibility without regard to the longitudinal stresses in the system.

The foregoing and many other objects of my invention will become apparent in the following description and drawings in which Figure 1 is a view in perspective showing the location of my novel device in an airplane fuselage.

Figure 2 is a side view showing the action of the frame of Figure 5 when a portion of the pipe or duct is displaced to a position where its axis is parallel to the original axis.

Figure 3 is a schematic view showing the operation of my novel longitudinal stress supporting frame of Figure 5 when the portion of the pipe or duct is displaced or bent at an angle to its orginal axis.

Figure 4:
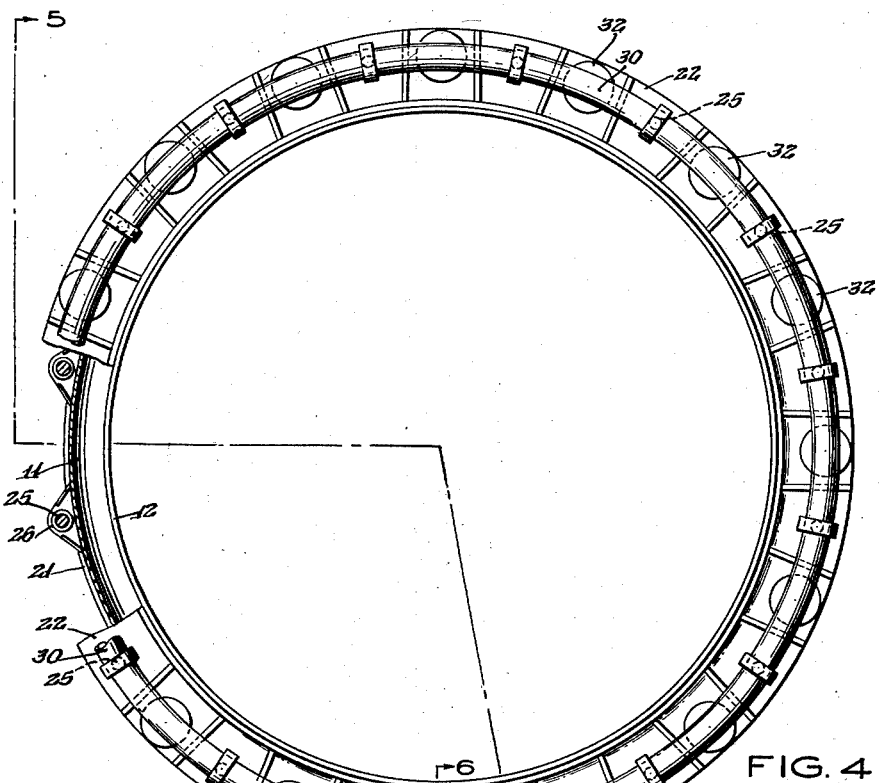
Figure 4 is an end view partly in section of my novel bellows connection.

Figure 5 is a sectional view taken on line 5—5 of Figure 4 showing my novel longitudinal thrust supporting frame surrounding a flexible duct or pipe connection.

Figures 5, 6:
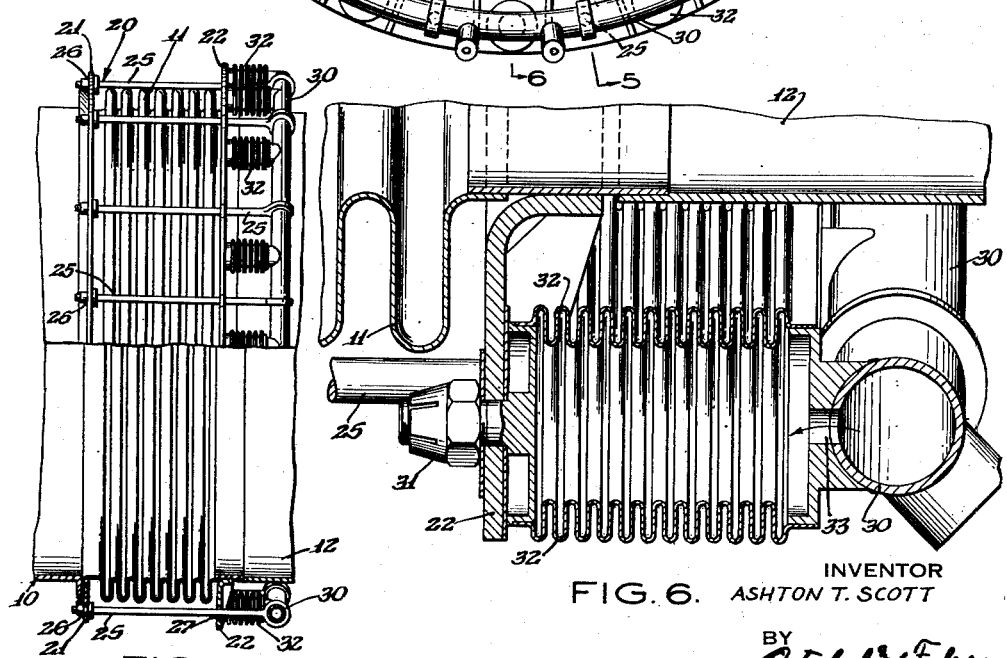

Figure 6 is a cross-sectional view taken on line 6—6 of Figure 4 looking in the direction of the arrows.

In Figure 1, I have shown an airplane 100 having a fuselage 101 with a jet-type engine 102, an exhaust duct 10, flexible bellows connection 11 and tail section 12 extending to the rear of the fuselage. Bellows 11 (Figures 4, 5 and 6) is a standard flexible bellows adapted to permit the tail piece 12 to be deflected as seen in Figure 2 to a position parallel to its original axis or to be bent as seen in Figure 3 to a position at an angle to its original axis.

Where the longitudinal stresses are comparatively small, then the bellows may be made stiff enough so that it will not be substantially extended by this longitudinal pressure while at the same time it may permit the lateral deflection to occur either parallel to the axis or at an angle thereto. Where, however, longitudinal stresses of the order of 10,000 pounds and higher occur, then the stiffening of the bellows 11 so that it will not be substantially extended by such a longitudinal stress makes the bellows substantially inflexible as far as lateral deflection is concerned so that a bend or break in the pipe becomes possible.

In order, therefore, to make possible the use of a bellows 11 which is sufficiently flexible to permit the lateral deflection to occur, I have found that my novel supporting frame 20 will support the bellows 11 substantially against longitudinal extension, taking up the longitudinal force while at the same time it will permit the coupling which comprises the bellows 11 to be flexible and therefore permit deflection or bending of tail pipe section 12.

The frame 20 as seen in Figures 4, 5 and 6 comprises a flange 21 secured to and surrounding the tail pipe section 10 and a flange 22 secured to and surrounding pipe section 12 on the opposite side of the bellows 11. A plurality of tie rods 25—25 are rigidly secured at 26—26 to flange 21 on pipe section 10. Tie rods 25—25 at their opposite ends pass through enlarged openings 27—27 (see the lower end of Figure 5) at the perimeter of flange 22 and extend beyond to the annular hollow fluid ring 30 to which they are secured.

A plurality of small bellows 32 are secured as shown in Figures 2 to 5 and especially Figure 6 by appropriate securing elements such as the nut 31 to the flange 22. The bellows 32 which are parallel to the tie rods 25 are preferably spaced between the tie rods 25 although they may, if desired, surround each tie rod 25. Each bellows is seated at the end adjacent flange 22. The opposite end of each bellows 32 communicates by passage 33 with the fluid ring 30.

Fluid ring 30 is filled with a substantially incompressible fluid, being completely filled and closed so that there are no voids in the fluid in annular ring 30 or the associated communicating bellows 32. The tie rods 25 are preferably substantially incompressible and inextensible, at least as far as the present application is concerned, but which is resiliently deflectable so that the tie rods 25 may be deflected laterally and resiliently as shown in Figures 2 and 3 to permit tail section 12 to move to a position where its axis is parallel to its original axis.

The cross section of the tie rods 25 is made of such a value that any reasonable expected deflection laterally of tail section 12 will be supported completely by the tie rods 25 so that the bellows 11 will act only as a flexible connecting joint which need only resist strains in a direction at right angles to its ordinary axis and which need not resist longitudinal stresses tending to straighten out the bellows.

Where the tail pipe 12 is bent by external forces at an angle to its original axis, as in Figure 3, then the plurality of small bellows 32 will permit relative movement of the tie bars 25 as shown in Figure 3 in order to allow this bend to occur while at the same time the shifting of the tie rods or bars 25 will be counterbalanced so that the forces will be equally distributed on all the tie rod bars 25 in the frame and no one of the tie bars or rods 25 will be subjected to the full force.

This is accomplished by the plurality of small bellows 32 and the fluid filled ring with which they communicate. When, as shown in Figure 3, a downward bend of tail section 12 occurs, the lower end of flange 22 is pushed toward the left or in the direction of the bend and the upper section of flange 22 on the outside of the bend is correspondingly pulled out.

The lower bellows 32a is thus extended and the upper bellows 32b is compressed. The other bellows are relatively compressed or extended in accordance with their relative position on the outside of the bend or the inside of the bend.

Fluid forced out from the bellows 32b by its compression transmits its pressure through the fluid filled ring 30 to the now expanded bellows 32a, thereby balancing the pressures in all the bellows 32. Thus, even when the tail pipe 12 is bent at an angle to its original axis, the longitudinal stress at the joint or flexible connection 11 is evenly distributed around the bellows 32 and hence through ring 30 to the tie rods or bars 25, each of them taking an equal portion of the load and each of them placing an equal portion of the load on the flange 22.

This is so because the total volume of the system comprising the fluid containing ring 30 and the multiple bellows 32 remains the same.

Thus, a large change in pressure in the main ducts 10, 12 does not cause any longitudinal change in the bellows 11 since all longitudinal stresses are absorbed and equalized by the tie rods 25.

Also, all deflections of the tail pipe 12, whether lateral or at an angle, are absorbed with respect to longitudinal stress at least by the tie rods 25.

Where the tail duct 12 is deflected parallel to its original axis as in Figure 2, the bending of tie rods 25 distributes the force equally and permits deflection of the bellows to occur while reinforcing the same.

A combination of lateral deflection and an angular bend of tail pipe 12 will result in bending of tie rods 25 as in Figure 2 and expansion and compression of bellows 32 to maintain equalized distribution of force.

By this means, therefore, a bellows or other flexible connection may be used which, since it need not be made sufficiently thick or rigid to absorb longitudinal stresses, may be sufficiently flexible to permit all deflections to occur. Also, by distributing all forces equally among the tie rods 25, the bending or deflecting stresses are equally transmitted to all portions of pipe 10 and no single portion thereof is subjected to the full bending moment.

In the foregoing I have described my invention in connection with an illustrative embodiment thereof. Since many modifications and variations of my invention will now be obvious to those skilled in the art, I prefer to be bound, not by the specific disclosure herein contained, but only by the appended claims.

I claim:

1. A reinforced flexible connection between two ducts; said flexible connection comprising a deflectable bendable conduit between said ducts; support members on each duct on opposite sides of the flexible connection; tie rods between said support members extending across said flexible connection; a hollow member surrounding one of said ducts and spaced from the support for said duct; the tie rods passing through said support and engaging said hollow member; a plurality of extensible containers between said last mentioned support and said hollow members; each container communicating with the hollow member; a substantially incompressible fluid filling said hollow member and containers.

2. A reinforced flexible connection between two ducts; said flexible connection comprising a deflectable bendable conduit between said ducts; support members on each duct on opposite sides of the flexible connection; tie rods between said support members extending across said flexible connection; a hollow member surrounding one of said ducts and spaced from the support for said duct; the tie rods passing through said support and engaging said hollow member; a plurality of extensible containers between said last mentioned support and said hollow member; each container communicating with the hollow member; a substantially incompressible fluid filling said hollow member and containers, bending said ducts at said flexible connection extending said containers at the inside of the bend and contracting the containers at the outside of the bend while maintaining the volume of the hollow member and containers the same.

3. A reinforced flexible connection between a stationary duct and a deflectable duct; said flexible connection comprising a deflectable bendable conduit between said ducts; a support member on said deflectable duct; a stationary support member at said stationary duct; tie rods between said support members extending across said flexible connection; a plurality of extensible containers between said last mentioned support and said hollow member; each container communicating with the hollow member; a substantially incompressible fluid filling said hollow member and containers, bending said ducts at said flexible connection, extending said containers at the inside of the bend and contracting the containers at the outside of the bend while maintaining the volume of the hollow member and containers the same.

4. A reinforced flexible connection between a stationary duct and a deflectable duct; said flexible connection comprising a deflectable bendable conduit between said ducts; a support member on said deflectable duct; a stationary support member at said stationary duct; deflectable tie rods between said support members extending across said flexible connection; a hollow member surrounding said stationary duct and spaced from the support for said duct; the tie rods passing through said support and engaging said hollow member; a plurality of extensible containers between said last mentioned support and said hollow member; each container communicating with the hollow member; a substantially incompressible fluid filling said hollow member and containers.

5. A reinforced flexible connection between a stationary duct and a deflectable duct; said flexible connection comprising a deflectable bendable conduit between said ducts; a support member on said deflectable duct; a stationary support member at said stationary duct; tie rods between said support members extending across said flexible connection; a hollow member surrounding said stationary duct and spaced from the support for said duct; the tie rods passing through said support and engaging said hollow member; a plurality of extensible containers between said last mentioned support and said hollow member; each container communicating with the hollow member; a substantially incompressible fluid filling said hollow member and containers, bending said ducts at said flexible connection extending said containers at the inside of the bend and contracting the containers at the outside of the bend while maintaining the volume of the hollow member and containers the same.

ASHTON T. SCOTT.

REFERENCES CITED

The following references are of record in the file of this patent:

UNITED STATES PATENTS

| Number | Name | Date |
|---|---|---|
| 1,219,849 | Norris | Mar. 20, 1917 |
| 2,337,038 | Fentress | Dec. 21, 1943 |
| 2,485,370 | Dreyer | Oct. 18, 1949 |
| 2,493,404 | Haynes | Jan. 3, 1950 |
| 2,506,293 | Copeland | May 2, 1950 |